United States Patent Office 2,880,183
Patented Mar. 31, 1959

2,880,183

COMBUSTION-RESISTANT FOAM RUBBER AND METHOD OF MAKING SAME

Frederick C. Weissert, Akron, Ohio, assignor to The Firestone Tire & Rubber Company, Akron, Ohio, a corporation of Ohio No Drawing. Continuation of applications Serial Nos. 487,007 and 487,008, February 9, 1955. This application August 28, 1958, Serial No. 757,686

15 Claims. (Cl. 260—2.5)

This invention relates to latex foam rubber and, more particularly, to latex foam rubber containing a major proportion of neoprene and having improved resistance to combustion. "Neoprene" is used herein in the usual sense as a polymer produced by the aqueous emulsion polymerization of chloroprene or of mixtures of chloroprene with other polymerizables wherein chloroprene is the major constituent. This application is a continuation application combining the subject matter of my two copending applications Serial Nos. 487,007 and 487,008, both filed February 9, 1955.

Foam rubber is produced from a neoprene latex in a manner similar to that used in the production of foam rubbers from natural or other synthetic rubber latices. Thus, neoprene latex is mixed with desired compounding materials, such as foam producing agents, vulcanizing ingredients, fillers, plasticizers and the like. The latex compound is frothed or foamed by any suitable means, such as for example by mechanical beating or whipping, or if desired, by action of a gas (either introduced from an external source or formed in the latex in situ) on the latex. Gelling agent for the neoprene latex is usually added to and mixed with the foam but under proper conditions can be added to the latex prior to foaming. The foam is poured into a suitable mold and allowed to set to an irreversible gelled foam. The gelled foam is subjected to vulcanizing conditions and the cured neoprene foam is washed and dried. Suitable foam producing agents include casein, ordinary soaps such as alkali metal and ammonium salts of fatty acids, sulfonated naphthalene derivatives, sulfated alcohols, or the like. Suitable vulcanizing ingredients include sulfur, sulfur donating materials, metal oxides such as zinc, magnesium, lead, calcium, or other metal oxides, and various accelerators and antioxidants, such as metallic salts of dialkyl dithiocarbamate, catechol, trimene base (triethyl trimethylene triamine), meta- or para-dinitrobenzene, phenyl-beta-naphthylamine or the like. Suitable gelling agents are the alkali metal silicofluorides, ammonium salts of inorganic acids such as ammonium nitrate, ammonium sulfate or the like, nitroparaffins, polyvinyl methyl ether and the like. Suitable plasticizers include light and medium processing oils, palm, castor and other vegetable oils, alkylated vegetable oils, petrolatum and various other waxes and the like. The above procedure and ingredients are also suitable for producing foam rubber from latex mixtures containing a major proportion of neoprene and a minor proportion of another rubber such as natural rubber or GR-S (a rubbery polymer produced by emulsion polymerization of butadiene, either alone or with a minor proportion of styrene).

Neoprene, as are many halogenated organic compounds, is essentially flame-resistant. This characteristic represents a major distinction between neoprene and natural rubber and many of the other synthetic rubbers such as GR-S and the like. When natural rubber or GR-S foam is subjected to an ignition source, the rubber foam is completely consumed by a violent combustion accompanied by flame. This is true even when the ignition source is quickly removed from the rubber foam. When neoprene foam, on the other hand, is subjected to an ignition source, the neoprene barely supports a flame and when the neoprene is removed from the ignition source, the neoprene flame goes out. Despite resistance to flaming combustion, neoprene foam has a propensity for flameless combustion. When a piece of neoprene foam is heated at, for example, about 200° C. the neoprene foam does not flame but chars completely with evolution of considerable heat and loses about one-half of its weight; at higher temperatures, neoprene foam also chars but the char itself burns. Additionally, when neoprene foam is brought in contact with a red hot metal object, it is noted that the neoprene foam first chars in the vicinity of the red hot object and the charring spreads throughout the remainder of the foam accompanied by a glowing but flameless combustion and evolution of considerable heat. The combustion of the neoprene foam is thus self-propagating when once started. Tendency for self-propagating combustion of a neoprene foam rubber increases with increase in size of the foam rubber. The above behavior of neoprene foam under various combustion conditions greatly detracts, for obvious reasons, from the other desirable properties of neoprene foam rubber. Similar, but somewhat augmented, difficulties are evidenced with neoprene foam rubbers containing minor quantities of more combustible rubbers such as natural rubber, GR-S and the like.

An object of the invention, therefore, is to permanently prevent or inhibit combustion of a neoprene-containing foam rubber. Another object is to provide a method of inhibiting the propagation of flameless combustion in neoprene foam rubber. Still another object is to provide a method of making neoprene foam rubber resistant to combustion without detracting appreciably from otherwise desirable properties of the foam rubber. Another object is to provide a neoprene-containing foam rubber which is particularly resistant to combustion. Another object is to provide a more combustion-resistant foam rubber.

The above and further objects are obtained in accordance with the present invention by incorporating in a neoprene-containing foam rubber a melamine-aldehyde condensation product or a mixture of a melamine-aldehyde condensation product and a compound which releases $P_2O_5$ under combustion conditions.

The melamine-aldehyde compound can be incorporated into the latex compound during the preparation of neoprene foam rubber, as for example, during or just prior to foaming of the latex compound. Preferably, however, melamine-aldehyde condensate is incorporated into a vulcanized neoprene rubber foam by impregnating the vulcanized foam with an aqueous solution or suspension of the condensate. When the condensate is introduced into the latex compound, the condensate is permanently bound to the neoprene foam during and as a consequence of conventional vulcanization of the foam. When the condensate is introduced into an already vulcanized neoprene foam, it is desirable to subject the treated foam to an elevated temperature to resinify the condensate and thus permanently bind it to the neoprene rubber foam.

Suitable melamine-aldehyde condensates are conveniently prepared by heating melamine with formaldehyde in an aqueous solution to produce a methylol-melamine. The aqueous solution of methylol-melamine is then used in the practice of the invention. Alternatively, the methylol-melamine can be alkylated by reacting with an alcohol such as methyl, ethyl, propyl, butyl and similar alcohols to produce an alkoxy methylol-melamine which is also suitable for producing the combustion-resistant neoprene foams of the invention. For the purpose of this invention, therefore, the terms "melamine - aldehyde condensation products" and "methylol-melamine" include the various alkoxy methylol-melamines. Although not essential for obtaining the results of the invention, it is often desirable to include a catalyst adapted for aiding or accelerating the formation of a resin from the melamine-aldehyde compound along with the melamine-aldehyde condensation product.

Suitable $P_2O_5$ producing compounds include many organic phosphates such as butyl phosphoric acid, vinyl bis(2-chloroethyl) phosphonate, tris(2-chloroethyl) phosphate, polyphosphoryl amide and the like. In selecting an organic phosphate compound, care should be taken to avoid those which tend to over-soften the neoprene rubber when used in sizeable quantities, for example, tricresyl phosphate and the like. Particularly preferred $P_2O_5$ producing compounds are phosphoric acid itself and various ammonium phosphates. Metal phosphates such as the alkali metal phosphates, alkaline earth metal phosphates and the like, since they do not provide $P_2O_5$ under combustion conditions, should be avoided. A mixture of melamine-aldehyde condensate and a $P_2O_5$ producing compound is conveniently incorporated into a vulcanized neoprene-containing foam rubber by any suitable means and preferably by impregnating the vulcanized foam rubber with either a hydrocarbon or aqueous solution or suspension of the mixture. Although not essential for obtaining the results of the invention, it is often desirable to include in the mixture of melamine-aldehyde condensate a $P_2O_5$ producing compound, a catalyst suitable for aiding the formation of a resin from the melaminealdehyde compound. Similarly, although not necesary to obtain the results of the invention, it is desirable to subject the impregnated foam rubber to an elevated temperature to assist in permanently binding the mixture to the foam rubber.

EXAMPLE 1

As an illustration of preparation of a suitable melamine-aldehyde condensate, 1 mole of melamine is heated in an aqueous solution of 3 moles of formaldehyde at a temperature of 90° C. until all of the melamine has dissolved; the reaction mixture is then allowed to cool. The water soluble methylol-melamine produced by this reaction is suitably mixed with a phosphoric acid or an ammonium salt thereof and the resulting mixture is used in the practice of the invention.

An impregnating bath was prepared by mixing together 8.3 parts by weight of a methylol-melamine made in accordance with the above procedure with 1.7 parts by weight of phosphoric acid ($H_3PO_4$). A vulcanized neoprene foam rubber sample weighing approximately 65 grams was impregnated with this mixture, dried and then heated for thirty minutes at 160° C. to permanently bind the mixture in the sample. The treated sample was found to contain 9% dry weight of the impregnating mixture based on the dry weight of neoprene in the sample. The treated sample was supported by wire gauze on a tripod and 4 grams of natural rubber foam was placed inside the neoprene sample. The natural rubber foam was ignited and allowed to burn until completely consumed—about five minutes. After all evidence of combustion had ceased, the neoprene foam rubber sample was weighed to determine any loss of weight resulting from combustion. There was no appreciable decrease in the weight of the neoprene foam rubber sample. A neoprene foam rubber sample, identical with the one used above with the exception that it had not been treated in accordance with the invention, was subjected to the same combustion test. After the test, it was noted that the untreated sample had charred completely and had lost approximately half its weight.

EXAMPLE 2

Another vulcanized neoprene foam rubber sample of essentially the same weight as the sample used in Example 1 was treated with an aqueous solution containing 8.3 parts by weight of a commercially available methylol-melamine (Resloom M—75[1]) and 1.7 parts by weight of diammonium phosphate. This sample was dried and heated under the same conditions as those used in Example 1 and was found to contain 7% dry weight of the impregnating mixture based on dry weight of neoprene in the sample. This sample was subjected to the same combustion test as the test used in Example 1 and was found to have lost about 1% of its weight as a result of the test. Very little charring of the sample resulted from the test.

EXAMPLE 3

Another vulcanized neoprene foam rubber sample was treated in accordance with the invention by impregnating the sample with an aqueous solution containing 7.1 parts by weight of another commercially available methylol-melamine (Resloom HP[2]) and 2.9 parts by weight of diammonium phosphate. The treated neoprene sample was dried and heated according to the same procedure used in the preceding examples and after treatment contained 15% by weight of impregnating mixture. This sample was subjected to the same combustion test used in the preceding examples and also lost about 1% of its weight as a result of the combustion test. Here too, very little charring of the sample treated in accordance with the invention was apparent.

EXAMPLE 4

Another vulcanized neoprene foam rubber sample of essentially the same weight as the samples of Examples 1, 2 and 3 was treated with an aqueous solution containing 10 parts by weight of Resloom HP and 4 parts by weight of octyl phosphoric acid. This sample was dried and heated under essentially the same conditions used in the preceding examples. The dry final weight of the impregnating mixture was found to be 7% based on the dry weight of neoprene in the sample. The treated sample was subjected to the same combustion test used in the preceding examples and found to have lost essentially no weight as a result of the test. Similarly, essentially no charring of the sample had occurred.

EXAMPLE 5

A 6" x 6" section of a neoprene foam rubber mattress was impregnated with an aqueous solution containing 6 parts by weight of Resloom HP and 6 parts by weight butyl phosphoric acid. The impregnated mattress section was dried and additionally heated in a manner essentially the same as that used in the preceding examples. The impregnated mattress section was found to contain 21 percent dry weight of the impregnating mixture based on the weight of neoprene in the foam rubber. In this instance a 10 gram natural rubber fuse was used; in other respects a combustion test was carried out in essentially the same manner as the tests of the preceding examples. The impregnated neoprene mattress section lost only 0.9 percent of its weight as a result of the test. Essentially no charring of the foam rubber had occurred.

Sample sections were cut from a commercial vulcanized neoprene foam rubber mattress. One of these samples was maintained as a control. Three other samples were

---

[1] Supplied by Monsanto Chemical Company as a water-clear 60% solution of resin.
[2] Also supplied by Monsanto Chemical Company but as 100% resin in white crystalline powder form.

impregnated with an aqueous impregnating solution in accordance with the invention having the following recipe:

| | Parts by weight |
|---|---|
| Resloom HP | 20 |
| Diammonium phosphate | 4 |
| Catalyst AC[1] | 1 |
| Water | 27 |

[1] Approximately 37% 2 methyl, 2 amino propanol hydrochloride and supplied by Monsanto Chemical Company as a curing aid for Resloom HP.

The three impregnated samples were so treated as to give products having varying add-ons of the methylol-melamine-phosphate mixture. The varying add-ons are set out in Table I hereafter. After immersion in the impregnating bath the treated samples were all squeezed between rubber rolls and allowed to dry in air over night. The partially dried samples were flexed by again passing through rolls and were then dried to a constant weight at 70° C. The thus treated samples were heated for thirty minutes at 130° C. to assist binding the mixture to the neoprene foam. Each of the samples, including the control sample, was subjected to a much more rigorous combustion test than the test used in the previous examples. This test consisted, in each instance, of supporting the sample on a tripod, heating a 4-ounce steel rivet to 800° C. and placing the heated rivet on top of the sample. The sample was observed until all signs of combustion had disappeared; the rivet was removed and the sample was weighed to determine any loss which had occurred as a result of combustion. The results of the test are reported in the following table:

*Table I*

| Example No. | Percent Mixture[1] | Weight Prior to Test (grams) | Weight After Test (grams) | Percent Loss of Weight |
|---|---|---|---|---|
| Control | 0 | 272 | 81 | 70.2 |
| 6 | 6.3 | 206 | 170 | 17.5 |
| 7 | 12.0 | 263 | 259 | 1.5 |
| 8 | 25.2 | 469 | 463 | 1.1 |

[1] Percent by weight based on the weight of neoprene of the mixture of melamine-aldehyde condensation product and ammonium phosphate.

Referring to the above and other results, the control sample broke out in flame and was entirely charred at the end of the test. No flame was apparent in the case of Examples 4 through 6 and charring occurred only in the immediate vicinity of the hot rivet.

EXAMPLE 9

One very desirable feature of the present invention is the permanence of the protection obtained in accordance with the invention even when the treated material is subjected to washing in warm water. As an illustration of this, a vulcanized neoprene foam rubber sample was immersed in a treating solution essentially the same as that used for Examples 6 through 8. The sample was removed from the impregnating bath, run through wringer rolls to remove a considerable portion of the fluid and dried to constant weight at 80° C. The sample was maintained at 70° C. for 16 hours and thereafter heated one hour at 140° C. The sample was weighed and determined to contain 35 parts by weight of the mixture in accordance with the invention per 100 parts by weight of the neoprene foam rubber. The sample was then soaked in a water bath for 9 hours at 60° C. and again dried to a constant weight. It was found that the sample still retained 24 parts by weight of the mixture in accordance with the invention per 100 parts by weight of the neoprene foam. It should here be noted that of the 11 parts by weight lost during washing, 7 parts by weight had been lost after the first 3 hours of washing; very little of the treating material was lost after this initial stage. The sample was then subjected to the same combustion test used in Examples 6 through 8 and was found to be quite resistant to combustion of any type. There was no flame and only a small amount of char formed in the vicinity of the red hot metal rivet. The loss of weight due to combustion was determined to be of the order of 4.7%.

EXAMPLE 10

A full sized vulcanized neoprene foam rubber mattress was immersed in a bath in accordance with the invention having the following formula:

| | Pounds |
|---|---|
| Resloom HP | 160.0 |
| Diammonium phosphate | 40.0 |
| Catalyst AC | 8.3 |
| Water | 285.0 |

The treated mattress was passed through squeeze rolls and dried to a constant weight by passing through a conveyor type drier maintained at temperatures varying from 135° C. at the entrance to 82° C. at the exit. Two hours were required for one pass through the drier. Five passes were required to achieve a constant weight of the mattress. The mattress was then subjected to one additional pass through the drier in order to insure binding of the impregnating mixture. The treated mattress contained 30 parts by weight of the mixture in accordance with the invention per 100 parts by weight of neoprene foam rubber. A one thousand gram sample was cut from the mattress and was subjected to the 800° C. hot rivet test used in certain of the preceding examples. The sample did not support combustion and lost only a few grams in weight as a result of the test.

EXAMPLE 11

Two 12″ x 12″ sample sections were taken from a commercial vulcanized neoprene foam mattress. One of the sections was treated by immersing in a bath such as that set out in Example 10. The treated sample was then run through squeeze rolls and dried to a constant weight and further heated according to the procedure of Example 10. The treated sample contained 25% by weight (dry) of the treating mixture based on the dry weight of neoprene. The other sample was not treated and was used as a control. Each of the two samples were placed on a tripod over a Fisher burner with a flame directed at a point three inches from the corner of the sample. The flame of the burner was in each instance directed against the sample for 10 minutes whereupon the burner was removed. The untreated sample continued to flame 12 minutes after removal of the burner and was found to have lost 84% of its weight as a result of the test. The sample treated in accordance with the invention did not flame after removal of the burner and was found to have lost only 5% of its weight as a result of the test.

EXAMPLE 12

Combustion-resistant rubber foam in accordance with the invention have rubber compositions preferably essentially entirely of neoprene. It has been found, however, that foam rubbers produced from blends of neoprene latex with other rubber latices, such as for example natural rubber latex and/or other synthetic latices, can be made combustion-resistant by treatment in accordance with the invention if the neoprene in such a blend is the major constituent of the blend. As an illustration of a combustion-resistant foam rubber of this type, a sample portion of a foam rubber containing 60 parts by weight neoprene and 40 parts by weight of natural rubber is impregnated with an aqueous solution containing a mixture of Resloom HP and diammonium phosphate in the ratio respectively of 8:2 and sufficient to provide an impregnated foam containing about 24 parts by weight (dry) of the impregnating mixture per 100 parts of polymer. The impregnated sample is dried and additionally heated in a manner similar to the procedures outlined in the preceding examples. A 10-inch natural rubber fuse is then burned in contact with the sample in the manner described in Example 5. There is very little loss in weight and charring of the foam rubber sample and the foam rubber sample does not support combustion.

As pointed out earlier, the most effective compounds which release $P_2O_5$ under combustion conditions are ammonium phosphates and phosphoric acid. Practice of the invention with an organic $P_2O_5$ producing compound has been illustrated by Example 5. As an illustration fo other suitable organic compounds, an impregnating bath was prepared by dispersing polyphosphoryl amide in water by means of Darvan #1 [3] and Triton X-100 [4] and mixing the polyphosphoryl amide dispersion with an aqueous solution of Resloom HP to produce a mixture containing polyphosphoryl amide and Resloom HP in the proportion respectively of 33:67. One of three identical neoprene foam rubber samples (each having the dimensins 3" x 8" x 8") was impregnated with this bath to a dry addend of 25 parts by weight of the impregnating mixture per 100 parts by weight of neoprene in the sample (this treated neoprene foam rubber is hereafter referred to under the designation Example 13). Another of the three neoprene foam rubber samples was impregnated to a dry addend of 29 parts by weight per 100 parts by weight neoprene with an aquous solution containing vinyl bis(2-chloroethyl) phosphonate and Resloom HP in the proportion respectively of 33:67 (this treated neoprene foam rubber is hereafter referred to under the designation Example 14). The remaining neoprene foam rubber sample was not treated and served as a control. Each of the three neoprene foam samples was subjected to the flame of a Bunsen burner. After 5 minutes of this treatment, the control was completely a flame and continued to char and burn after removal of the Bunsen burner; when combustion of the control had ceased the entire sample was charred and of no value. In the course of the test the control had lost 69.8% of its original weight. The neoprene foam samples of Examples 13 and 14 were subjected to the flame of the Bunsen burner for 10 minutes; the samples were then removed from the flame of the burner. After all signs of combustion had ceased, it was noted that a major portion of each of these foams was entirely unaffected by the flame. As a result of this rigorous test Example 13 lost only 22.6% of its original weight and Example 14 lost only 27% of its original weight.

The mixtures of melamine-aldehyde condensation products with $P_2O_5$ producing compounds, suitable for practice of the invention, contain about 5 to about 35 parts by weight of a $P_2O_5$ producing compound and correspondingly about 95 to about 65 parts by weight of a melamine-aldehyde condensation product. Preferred mixtures contain about 20 parts by weight of a $P_2O_5$ producing compound and about 80 parts by weight of a melamine-aldehyde condensation product. In the practice of the invention these mixtures are used in amounts effective for improving the combustion-resistance of a foam rubber. Foam rubbers containing about 10 to about 30 parts by weight (dry) of the mixture per 100 parts by weight of rubber in the foam are preferred. However, desirable results are obtained by using smaller or large amounts of the mixture, e.g. about 5 to about 50 parts by weight per 100 parts rubber in the foam.

EXAMPLE 15

As an illustration of practicing the invention without using a mixture of melamine-aldehyde condensate with a $P_2O_5$ liberating compound, one mole of melamine is heated in an aqueous solution with three moles of formaldehyde at a pH of 8 to 9 at about 90° C. until all of the melamine dissolves. The reaction mixture is then cooled, whereupon it is ready for use.

The above aqueous methylol-melamine solution was used to impregnate a vulcanized neoprene rubber foam sample. The impregnated sample was dried and heated at 155° C. to cure the resin. A 65 gram test portion of the sample (containing 12.5% by weight (dry) of the melamine-formaldehyde resin based on the weight of neoprene) was supported on a wire gauze on a tripod. A 4 gram piece of natural rubber foam was placed in the center of the neoprene test portion and ignited. After the natural rubber ceased to burn, there was only a slight amount of charring of the neoprene test portion. The test portion was then weighed and had lost only 1.5 grams (2.3%) as a result of the test. An identical neoprene foam sample, except for the fact that it had not been impregnated with resin in accordance with the invention, was subjected to the same test. This sample was almost entirely charred and had lost 30.2 grams (46.4%) as a result of the test.

EXAMPLE 16

Another sample of neoprene rubber foam was impregnated with another portion of the methylol-melamine used in Example 15 above. The impregnated foam was dried and heated to cure the resin. In this instance the melamine-formaldehyde resin in the treated neoprene foam amounted to 22% by weight based on the weight of neoprene. In order to determine whether the impregnated foam could withstand washing, it was soaked in water at 90° C. for four hours and thereafter dried. The treated, washed and dried neoprene foam sample was subjected to the same "burning natural rubber test" used in Example 15 and lost no appreciable weight as a result of the test. An identical neoprene foam sample, except that it had not been impregnated with melamine resin lost 50.8% by weight during an identical test. It is seen that impregnating a neoprene foam in accordance with the invention greatly reduces the combustibility of the foam.

EXAMPLE 17

Another sample of neoprene foam rubber was impregnated with a commercially available methylol-melamine [5] to an amount equal to 16% of the weight of the rubber in the sample. The impregnant was cured into the foam and the treated foam was soaked in water at 90° C. for eight hours. The treated and washed foam was dried and subjected to the same test used in the Examples 15 and 16. Here the neoprene foam impregnated in accordance with the invention lost 1.52% by weight due to charring as a result of the test. An identical neoprene foam, except that it contained no resin, lost 50.8% by weight as a result of the test.

EXAMPLE 18

Another sample of neoprene foam rubber was impregnated with an aqueous solution, of another commercially available methylol-melamine.[6] The impregnated foam was subjected to heating at 147° C. for 30 minutes to cure the resin. The neoprene foam was then washed in 90° C. water for 11 hours, dried and contained 9% by weight of the melamine-aldehyde condensation product based on the weight of neoprene. The treated sample was subjected to the burning natural rubber test used in Examples 15, 16 and 17 and lost very little weight as a result of the test.

EXAMPLE 19

Another sample of neoprene rubber foam was impregnated with still another commercially available melamine-

---

[3] Polymerized sodium salts of alkylnaphthalene sulfonic acids supplied by R. T. Vanderbilt Co. Inc.
[4] An alkyl aryl polyether alcohol supplied by Rohm & Haas Co.
[5] Resloom-M75, supplied as a clear, colorless liquid by Monsanto Chemical Company.
[6] Resloom HP also supplied by Monsanto Chemical Company—a white crystalline powder.

aldehyde condensate.[7] The impregnated foam was subjected to a cure of 90 minutes at 147° C., was washed for 11 hours at 90° C. and was then dried. The treated foam contained a final add-on of impregnant of 10% by weight. When this treated foam was subjected to the burning rubber test, it lost no appreciable weight as a result of the test.

EXAMPLE 20

Another sample of neoprene rubber foam was impregnated with an aqueous solution of Resloom HP. The sample was dried and the resin cured therein. The final resin content of the foam sample was 26%. The total weight of the impregnated sample was 264 grams. The sample was placed on a tripod and a 4-ounce steel rivet which had been heated in an oven until it reached a temperature of 800° C. was placed on the top of the sample. A stream of air was forced against the sample and the red hot rivet in order to assist any combustion which might occur. After the rivet had cooled and all indication of combustion had ceased, it was noted that the sample was charred only in the vicinity of the rivet. The rivet was removed and the sample weighed. The sample had lost only 16 grams (6.06%) as a result of this very rigorous test. A comparable neoprene foam sample, but not treated in accordance with the invention, was completely charred and lost approximately one-half its weight as a result of the test.

EXAMPLE 21

Another sample of neoprene foam rubber was impregnated with Resloom HP in the same manner used in Example 20. In this instance, the Resloom content of the impregnated foam was 18.3% and the impregnated sample weighed 210 grams. The impregnated sample was subjected to the same hot rivet test described in Example 20. Only a very small portion of this sample, immediately surrounding the hot rivet, was charred by the test. The sample had lost only 5 grams (2.4% by weight) as a result of the test.

In the practice of the invention without a $P_2O_5$ evolving compound, the melamine-aldehyde condensates are used in amounts effective for increasing the combustion-resistance of a neoprene foam rubber. The condensates are ordinarily used in amounts within the range of about 10 to 35 parts by weight per 100 parts by weight of neoprene in the foam rubber. Appreciably smaller amounts of a melamine-aldehyde condensate are relatively ineffective. Any desired larger amounts of the condensates are effective and can be used.

What I claim is:

1. In combination, a vulcanized chloroprene polymer foam rubber and at least about 10 parts by weight per 100 parts by weight chloroprene polymer of a melamine-aldehyde condensation product, said foam rubber containing said condensation product whereby said foam rubber has improved resistance to combustion.

2. A method of improving the combustion-resistance of chloroprene polymer foam rubber which comprises incorporating at least about 10 parts by weight per 100 parts by weight chloroprene polymer of a melamine-aldehyde condensation product into a chloroprene polymer foam rubber.

3. A method of improving the combustion-resistance of chloroprene polymer foam rubber which comprises incorporating at least about 10 parts by weight per 100 parts chloroprene polymer of a melamine-aldehyde condensation product into a vulcanized chloroprene polymer foam rubber and thereafter heating the treated foam rubber to bind said condensation product to said foam rubber.

4. A method of improving the combustion-resistance of chloroprene polymer foam rubber which comprises impregnating a vulcanized chloroprene polymer foam rubber with an aqueous solution of a methylol-melamine in a concentration sufficient to deposit at least about 10 parts by weight per 100 parts chloroprene polymer of said methylol-melamine in said foam rubber and thereafter heating the impregnated foam rubber to polymerize and bind said methylol-melamine to said foam rubber.

5. A combustion-resistant foam rubber comprising a vulcanized chloroprene polymer foam rubber containing a mixture of a melamine-formaldehyde condensation product and a compound capable of releasing $P_2O_5$ at temperatures from about 200° C. to about 800° C., said mixture being present in said foam rubber in an amount within the range of about 5 to 50 parts by weight per 100 parts chloroprene polymer and said mixture comprising about 5 to about 35 parts by weight of the $P_2O_5$ releasing compound and correspondingly about 95 to about 65 parts by weight of the melamine-formaldehyde condensation product.

6. A method of producing essentially completely combustion-resistant chloroprene polymer foam rubber which comprises incorporating in a vulcanized chloroprene polymer foam rubber 5 to 50 parts by weight per 100 parts chloroprene polymer of a mixture of about 95 to about 65 parts by weight of a melamine-formaldehyde condensation product with about 5 to about 35 parts by weight of a compound capable of releasing $P_2O_5$ at temperatures from about 200° C. to about 800° C.

7. In combination, a vulcanized chloroprene polymer foam rubber and about 5 to about 50 parts by weight per 100 parts chloroprene polymer of a mixture of about 95 to about 65 parts by weight of a melamine-formaldehyde condensation product with about 5 to about 35 parts by weight of a phosphoric acid, said foam rubber containing said mixture whereby said foam rubber is essentially completely resistant to combustion at temperatures from about 200° C. to about 800° C.

8. In combination, a vulcanized chloroprene polymer foam rubber and about 5 to about 50 parts by weight per 100 parts chloroprene polymer of a mixture of about 95 to about 65 parts by weight of a melamine-formaldehyde condensation product with about 5 to about 35 parts by weight of an ammonium phosphate, said foam rubber containing said mixture whereby said foam rubber is essentially completely resistant to combustion at temperatures from about 200° C. to about 800° C.

9. In combination, a vulcanized chloroprene polymer foam rubber and about 5 to about 50 parts by weight per 100 parts chloroprene polymer of a mixture of about 95 to about 65 parts by weight of a melamine-formaldehyde condensation product with about 5 to about 35 parts by weight of an organic compound which is capable of releasing $P_2O_5$ at temperatures from about 200° C. to about 800° C. said foam rubber containing said mixture whereby said foam rubber is essentially completely resistant to combustion at temperatures from about 200° C. to about 800° C.

10. In combination, a vulcanized chloroprene polymer foam rubber and about 5 to about 50 parts by weight per 100 parts chloroprene polymer of a mixture of about 95 to about 65 parts by weight of a melamine-formaldehyde condensation product with about 5 to about 35 parts by weight of butyl phosphoric acid, said foam rubber containing said mixture whereby said foam rubber is essentially completely resistant to combustion at temperatures from about 200° C. to about 800° C.

11. In combination, a vulcanized chloroprene polymer foam rubber and about 5 to about 50 parts by weight per 100 parts chloroprene polymer of a mixture of about 95 to about 65 parts by weight of a melamine-formaldehyde condensation product with about 5 to about 35 parts by weight of polyphosphoryl amide, said foam rubber containing said mixture whereby said foam rubber is

---

[7] Resimene 875—a butylated melamine-aldehyde condensate dissolved in equal parts of butanol and xylol and supplied by Monsanto Chemical Company.

essentially completely resistant to combustion at temperatures from about 200° C. to about 800° C.

12. In combination, a vulcanized chloroprene polymer foam rubber and about 5 to about 50 parts by weight per 100 parts chloroprene polymer of a mixture of about 95 to about 65 parts by weight of a melamine-formaldehyde condensation product with about 5 to about 35 parts by weight of vinyl bis(2-chloroethyl) phosphonate, said foam rubber containing said mixture whereby said foam rubber is essentially completely resistant to combustion at temperatures from about 200° C. to about 800° C.

13. In combination, a vulcanized chloroprene polymer foam rubber and about 5 to about 50 parts by weight per 100 parts chloroprene polymer of a mixture of about 95 to about 65 parts by weight of a melamine-formaldehyde condensation product with about 5 to about 35 parts by weight of a compound capable of releasing $P_2O_5$, at temperatures from about 200° C. to about 800° C., said foam rubber containing said mixture whereby said foam rubber is essentially completely resistant to combustion at temperatures from about 200° C. to about 800° C.

14. A method of improving the combustion-resistance of a vulcanized foam rubber wherein the major rubber constituent is chloroprene polymer, which comprises incorporating in said foam rubber about 5 to about 50 parts by weight per 100 parts rubber constituent of a mixture of about 95 to about 65 parts by weight of a melamine-formaldehyde condensation product and about 5 to about 35 parts by weight of a compound capable of releasing $P_2O_5$ at temperatures from about 200° C. to about 800° C.

15. A vulcanized foam rubber having a rubber composition including a major proportion of chloroprene polymer and containing about 5 to about 50 parts by weight per 100 parts rubber composition of a mixture of about 95 to about 65 parts by weight of a melamine-formaldehyde condensation product and about 5 to about 35 parts by weight of a compound capable of releasing $P_2O_5$ at temperatures from about 200° C. to about 800° C., whereby said foam rubber has improved resistance to combustion.

No references cited.